United States Patent
Okada

(10) Patent No.: US 8,547,620 B2
(45) Date of Patent: Oct. 1, 2013

(54) LIGHT MODULATION DEVICE

(75) Inventor: Norio Okada, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 268 days.

(21) Appl. No.: 13/090,290

(22) Filed: Apr. 20, 2011

(65) Prior Publication Data
US 2012/0092743 A1   Apr. 19, 2012

(30) Foreign Application Priority Data

Oct. 15, 2010  (JP) ................................. 2010-232207

(51) Int. Cl.
*G02B 26/00* (2006.01)
*G02F 1/01* (2006.01)

(52) U.S. Cl.
USPC ......................................... 359/238; 359/240

(58) Field of Classification Search
USPC ................................................ 359/240, 245
See application file for complete search history.

(56) References Cited

U.S. PATENT DOCUMENTS

| 5,732,097 A | 3/1998 | Yamaguchi et al. |
| 6,735,353 B2 | 5/2004 | Hirata et al. |
| 2004/0202397 A1* | 10/2004 | Hatta et al. ........................ 385/2 |
| 2007/0183790 A1* | 8/2007 | Matsumoto ................... 398/182 |
| 2007/0195397 A1 | 8/2007 | Okada |

FOREIGN PATENT DOCUMENTS

| JP | 9-33867 A | 2/1997 |
| JP | 2001-156386 A | 6/2001 |
| JP | 2003-222826 A | 8/2003 |
| JP | 2004-165918 A | 6/2004 |
| JP | 2007-194365 A | 8/2007 |
| JP | 2007-225904 A | 9/2007 |

\* cited by examiner

*Primary Examiner* — Mahidere Sahle
(74) *Attorney, Agent, or Firm* — Leydig, Voit & Mayer, Ltd.

(57) ABSTRACT

A light modulation device includes: an input terminal into which a modulation signal is input; a light modulation element including an anode connected to the input terminal and a cathode that is grounded; a matching resistor connected in parallel with the light modulation element; a matching capacitor connected to the light modulation element and connected in series to the matching resistor; and a protective resistor connected in parallel with the light modulation element, the matching resistor, and the matching capacitor.

8 Claims, 2 Drawing Sheets

LIGHT MODULATION DEVICE

BACKGROUND OF THE INVENTION

1. Field of the Invention

The present invention relates to a light modulation device that can prevent the deterioration of high frequency characteristics, reduce power consumption, and prevent the failure of light modulation elements.

2. Background Art

In conventional light modulation devices, a resistor was connected to a light modulation element in parallel. Since the resistor functions as a matching resistor for matching high frequencies, the deterioration of high frequency characteristics can be prevented (for example, refer to Japanese Patent Application Laid-Open No. 2007-225904).

SUMMARY OF THE INVENTION

In conventional light modulation devices, if DC bias is applied to the anode of the light modulation element, DC bias is also applied to the matching resistor. Therefore, the heating value is elevated, and power consumption is increased. If a capacitor is connected between the matching resistor and GND to prevent increased power consumption, the light modulation element is easily charged. Therefore, the failure of the light modulation element occurs easily.

In view of the above-described problems, an object of the present invention is to provide a light modulation device that can prevent the deterioration of high frequency characteristics, reduce power consumption, and prevent the failure of light modulation elements.

According to the present invention, a light modulation device includes: an input terminal in which a modulation signal is inputted; a light modulation element including an anode connected to the input terminal and a cathode grounded; a matching resistor connected to the light modulation element in parallel; a matching capacitor connected to the light modulation element in parallel and connected to the matching resistor in series; and a protective resistor connected to the light modulation element, the matching resistor, and the matching capacitor in parallel.

The present invention makes it possible to prevent the deterioration of high frequency characteristics, reduce power consumption, and prevent the failure of light modulation elements.

Other and further objects, features and advantages of the invention will appear more fully from the following description.

DETAILED DESCRIPTION OF THE PREFERRED EMBODIMENTS

A light modulation device according to the embodiments of the present invention will be described with reference to the drawings. The same components will be denoted by the same symbols, and the repeated description thereof may be omitted.

First Embodiment

Figure 1:
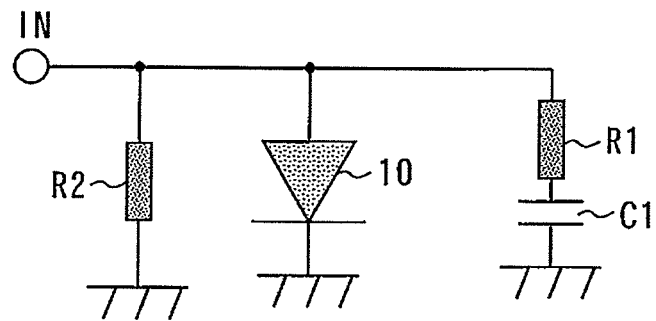
FIG. 1 is a diagram showing a light modulation device according to the first embodiment.

FIG. 1 is a diagram showing a light modulation device according to the first embodiment. Modulation signals are inputted in an input terminal IN. The anode of the light modulation element 10 is connected to the input terminal IN, and the cathode of the light modulation element 10 is grounded. A matching resistor R1 and a matching capacitor C1 are connected to the light modulation element 10 in parallel. The matching capacitor C1 is connected to the matching resistor R1 in series. The protective resistor R2 is connected to light modulation element 10, the matching resistor R1, and the matching capacitor C1 in parallel. The protective resistor R2 has a resistance value sufficiently larger than the resistance value of the matching resistor R1.

The light modulation element 10 is driven by the modulation signals inputted in the input terminal IN. The modulation signals contain not only AC components around 0 V but also DC components. Here, since the matching capacitor C1 is connected to the matching resistor R1 in series, the DC components of the modulation signals are not applied to the matching resistor R1, but only the AC components are applied to the matching resistor R1.

When the resistance values of the matching resistor R1 and the protective resistor R2 are R1 and R2, respectively, and the impedance of the matching capacitor C1 is negligible in the frequency of 10 kHz or higher, the total impedance Zo at the frequency of 10 kHz or higher can be expressed as: $Zo=(R1 \times R2)/(R1+R2)$.

Impedance for the AC component of modulation signals becomes Zo, and Zo becomes the matching resistor for matching high frequencies. Therefore, when the impedance of the transmission line is Zo, matching can be taken, and the deterioration of high frequency characteristics can be prevented. On the other hand, impedance for the DC component of modulation signals becomes R2. Since Zo is lower than R2, the matching resistor R1 is directly connected to GND, the heating value is lowered in comparison with the case wherein the same DC bias is applied to the light modulation element 10, and the power consumption can be reduced.

In addition, although the light modulation element 10 functions as a diode having capacity characteristics, the anode of the light modulation element 10 is not charged by the protective resistor R2 connected between the anode of the light modulation element 10 and GND. Therefore, even if the surge is inputted, the current flows toward the protective resistor R2, and the failure of the light modulation element 10 can be prevented.

Furthermore, the resistance value R1 of the matching resistor R1 and the resistance value R2 of the protective resistor R2 preferably satisfy the relationship of $R1 \times 0.95 < (R1 \times R2)/(R1+R2)$. This relationship is materialized when R2 is extremely larger than R1. For example, when $R1=50\Omega$ and $R2=1\ k\Omega$, $(R1 \times R2)/(R1+R2)$ becomes $47.61\Omega$. When this relationship is satisfied, the composite resistance of R1 and R2 can be nearly equal to R1. Therefore, since matching can be satisfied even if the line impedance is equalized to R1, the deterioration of high frequency characteristics can be prevented. Furthermore, since R2 is satisfactorily large in comparison with the line impedance, it is negligible from the point of view of impedance matching where the protective resistor R2 is connected on the line. Therefore, the freedom of the constitution is elevated.

Second Embodiment

Figure 2:
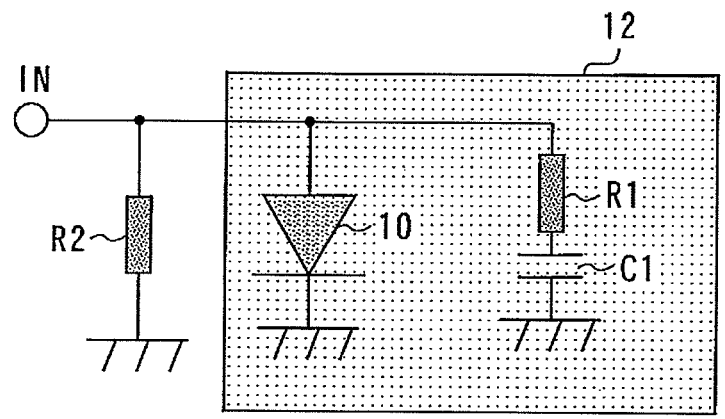
FIG. 2 is a diagram showing a light modulation device according to the second embodiment.

FIG. 2 is a diagram showing a light modulation device according to the second embodiment. A Peltier module 12 (cooler) is added to the constitution of the first embodiment. The Peltier module 12 cools the light modulation element 10 which requires temperature control. The light modulation element 10, the matching resistor R1, and the matching capacitor C1 are formed on the Peltier module 12. The protective resistor R2 is formed in the outside of the Peltier module 12.

Since the DC component of modulation signals are applied to the protective resistor R2 the heating value of the protective resistor R2 is high. Therefore, by forming the protective resistor R2 in the outside of the Peltier module 12, the heating value absorbed by the Peltier module 12 can be reduced, and power consumption by the Peltier module 12 can be lowered.

Third Embodiment

Figure 3:
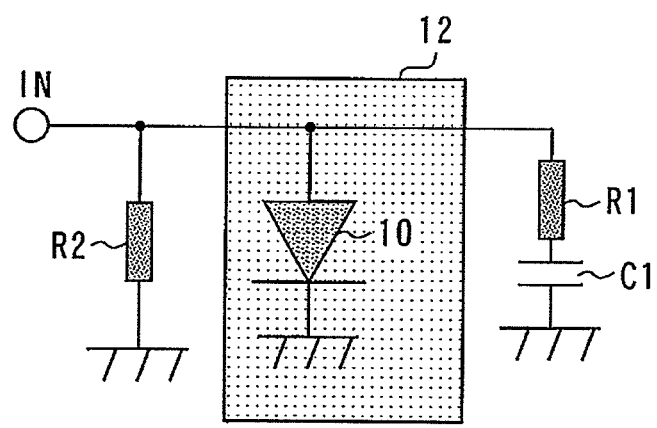
FIG. 3 is a diagram showing a light modulation device according to the third embodiment.

FIG. 3 is a diagram showing a light modulation device according to the third embodiment. Different from the second embodiment, the matching resistor R1 and the matching capacitor C1 are formed in the outside of the Peltier module 12.

Although only the AC component of the modulation signals is applied to the matching resistor R1, the voltage signals of, for example, ±1.0 V is applied thereto, and the heating value when the resistance value of the matching resistor R1 is 50Ω becomes $(1/\sqrt{2})^2/50=10$ (mW). By placing the matching resistor R1 in the outside of the Peltier module 12, the heating value absorbed by the Peltier module 12 can be further reduced, and power consumption by the Peltier module 12 can be further lowered.

Fourth Embodiment

Figure 4:
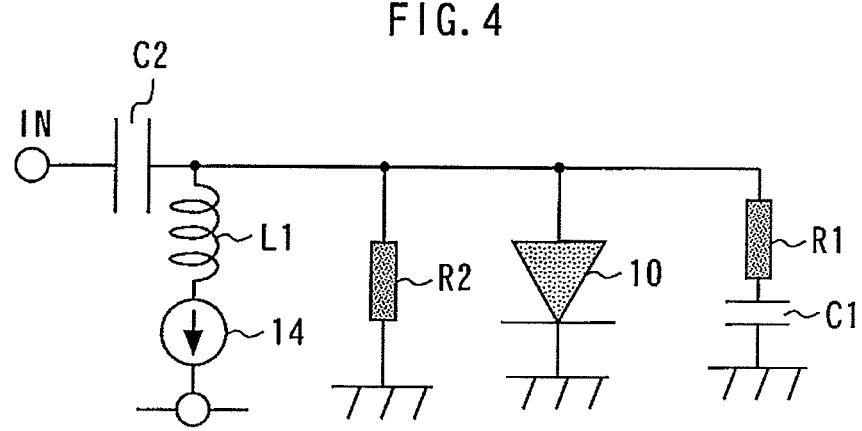
FIG. 4 is a diagram showing a light modulation device according to the fourth embodiment.

FIG. 4 is a diagram showing a light modulation device according to the fourth embodiment. A bias T circuit consisting of the capacitor C2 and the coil L1, and a current-absorbing-type current source circuit 14 are added to the constitution of the first embodiment. A capacitor C2 is connected between the input terminal IN and the anode of the light modulation element 10. An end of the coil L1 is connected to the anode of the light modulation element 10. The current source circuit 14 is connected to the anode of the light modulation element 10 via the coil L1.

When the bias T circuit is connected, in general, a DC offset voltage of about −1.2 V to −0.4 V is applied. When the current-absorbing-type current source circuit 14 is connected to the coil L1 of the bias T, the current does not flow through the matching resistor R1, but flows only through the protective resistor R2.

Since the bias voltage is determined by the product of the resistance of the protective resistor R2 and the current, the same bias can be formed by a less current in comparison with the case wherein no matching capacitor C1 is used and the matching resistor R1 is directly connected to GND, and power consumption can be reduced.

In addition, when the matching capacitor C1 is present, and the protective resistor R2 is absent, the current is drawn from the light modulation element 10, and failure of the light modulation element 10 is apt to occur. The protective resistor R2 plays the role for protection thereof.

Fifth Embodiment

Figure 5:
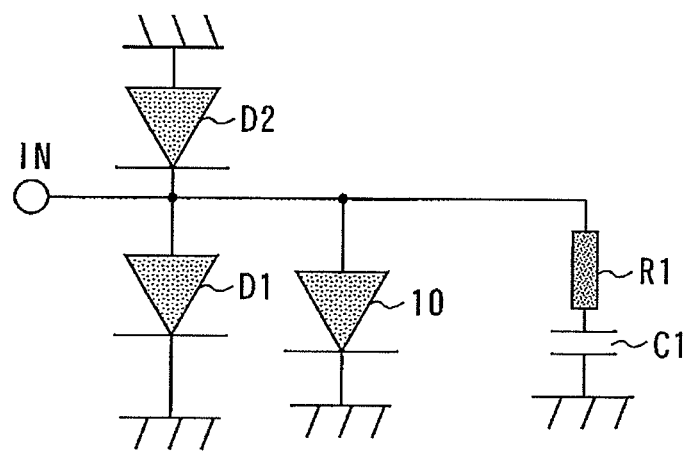
FIG. 5 is a diagram showing a light modulation device according to the fifth embodiment.

FIG. 5 is a diagram showing a light modulation device according to the fifth embodiment. In place of the protective resistor R2 according to the first embodiment, first and second protective diodes D1 and D2 having different polarities are formed. The anode of the first protective diode D1 is connected to the input terminal IN, and the cathode thereof is grounded. The anode of the second protective diode D2 is grounded, and the cathode thereof is connected to the input terminal IN. The first and second protective diodes D1 and D2 are connected to the light modulation element 10, the matching resistor R1 and the matching capacitor C1 in parallel.

As described above, when the matching capacitor C1 is connected between the matching resistor R1 and GND, since the light modulation element 10 is easily charged, the failure of the light modulation element 10 is apt to occur. Therefore, in the present embodiment, first and second protective diodes D1 and D2 are connected to the light modulation element 10 in parallel. Thereby, even if surge is inputted, since current flows in the first and second protective diodes D1 and D2, the failure of the light modulation element 10 can be prevented. Otherwise, the effect equivalent to the effect of the first embodiment can be obtained.

In addition, the passing band is determined by the composite capacity of the light modulation element 10 and the first and second protective diodes D1 and D2 and the composite resistance of the matching resistor R1 and the protective resistor R2. Therefore, the deterioration of the passing band is less as the composite capacities of the first and second protective diode D1 and D2 is smaller. Therefore, it is preferable that the capacity Ca of the light modulation element 10 and the composite capacity Cb of the first and second protective diode D1 and D2 satisfy the relationship of Cb<Ca×6.25. When this relationship is satisfied, the level of the band deterioration becomes negligible.

Sixth Embodiment

Figure 6:
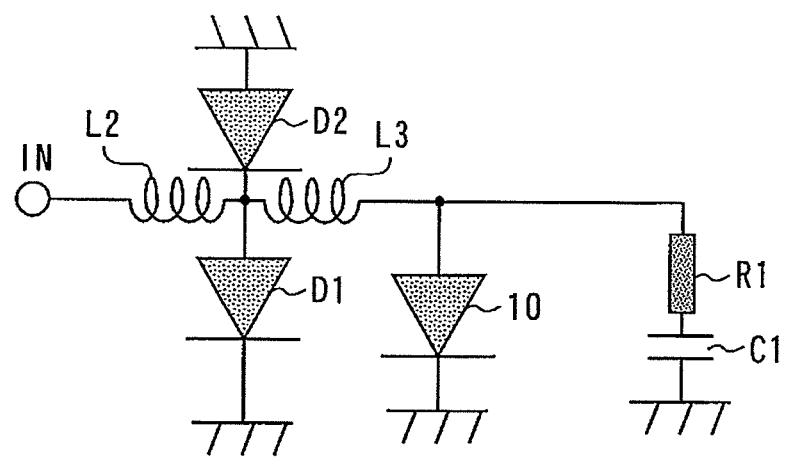
FIG. 6 is a diagram showing a light modulation device according to the sixth embodiment.

FIG. 6 is a diagram showing a light modulation device according to the sixth embodiment. First and second inductors L2 and L3 are added to the constitution of the fifth embodiment. The first inductor L2 is connected between the anode of the first protective diode D1 and the input terminal IN. The second inductor L3 is connected between the anode of the first protective diode D1 and the anode of the light modulation element 10.

Since the first and second protective diode D1 and D2 have capacity component, impedance matching with the transmission line can be easily obtained by connecting with the first and second inductors L2 and L3. When the inductance L of the first and second inductors L2 and L3 is set to be $Z=(L/Cb)^{0.5}$, where Z is line impedance, and Cb is the composite capacity of first and second protective diodes D1 and D2, impedance matching can be achieved.

Obviously many modifications and variations of the present invention are possible in the light of the above teachings. It is therefore to be understood that within the scope of the appended claims the invention may be practiced otherwise than as specifically described.

The entire disclosure of a Japanese Patent Application No. 2010-232207, filed on Oct. 15, 2010 including specification, claims, drawings and summary, on which the Convention priority of the present application is based, are incorporated herein by reference in its entirety.

What is claimed is:

1. A light modulation device comprising:
    an input terminal into which a modulation signal is input;
    a light modulation element including an anode connected to the input terminal and a cathode connected to ground;
    a matching resistor and a matching capacitor electrically connected in series with each other, as a matching circuit, wherein
        the matching circuit is electrically connected in parallel with the light modulation element, and
        the matching circuit is electrically connected to and between the input terminal and the ground; and
    a protective resistor electrically connected in parallel with the light modulation element, wherein the matching circuit is electrically connected in parallel with the protective resistor.

2. The light modulation device according to claim 1, further comprising a cooler cooling the light modulation element, wherein the light modulation element is located on the cooler, and the protective resistor is located outside of the cooler.

3. The light modulation device according to claim 2, wherein the matching resistor and the matching capacitor are located outside of the cooler.

4. The light modulation device according to claim 1, further comprising:
    a capacitor electrically connected between the input terminal and the anode of the light modulation element; and
    a coil and a current-adsorbing current source circuit electrically connected in series, as part of a bias circuit, wherein the bias circuit is electrically connected to the anode of the light modulation element and the current-absorbing current source circuit is connected to the anode of the light modulation element through the coil.

5. The light modulation device according to claim 1, wherein the matching resistor has a resistance $R1$, the protective resistors has a resistance of $R2$, and $R1 \times 0.95 < (R1 \times R2)/(R1+R2)$.

6. A light modulation device comprising:
    an input terminal into which a modulation signal is input;
    a light modulation element including an anode connected to the input terminal and a cathode connected to ground;
    a matching resistor and a matching capacitor electrically connected in series with each other, as a matching circuit, wherein
        the matching circuit is electrically connected in parallel with the light modulation element, and
        the matching circuit is electrically connected to and between the input terminal and the ground;
    a first protective diode including an anode electrically connected to the input terminal and a cathode that is grounded, wherein the first protective diode is electrically connected in parallel with both the light modulation element and the matching circuit; and
    a second protective diode including an anode that is grounded and a cathode electrically connected to the input terminal, wherein the second protective diode is electrically connected in parallel with both the light modulation element and the matching circuit.

7. The light modulation device according to claim 6, wherein the light modulation element has a capacitance $Ca$, the first and second protective diodes have a composite capacitance $Cb$, and $Cb < Ca \times 0.25$.

8. The light modulation device according to claim 6, further comprising:
    a first inductor electrically connected between the anode of the first protective diode and the input terminal; and
    a second inductor electrically connected between the anode of the first protective diode and the anode of the light modulation element.

* * * * *